May 27, 1924.
G. H. DAWSON
SUPPORT FOR INDEX CARDS
Filed Dec. 5, 1921
1,495,252
2 Sheets-Sheet 1
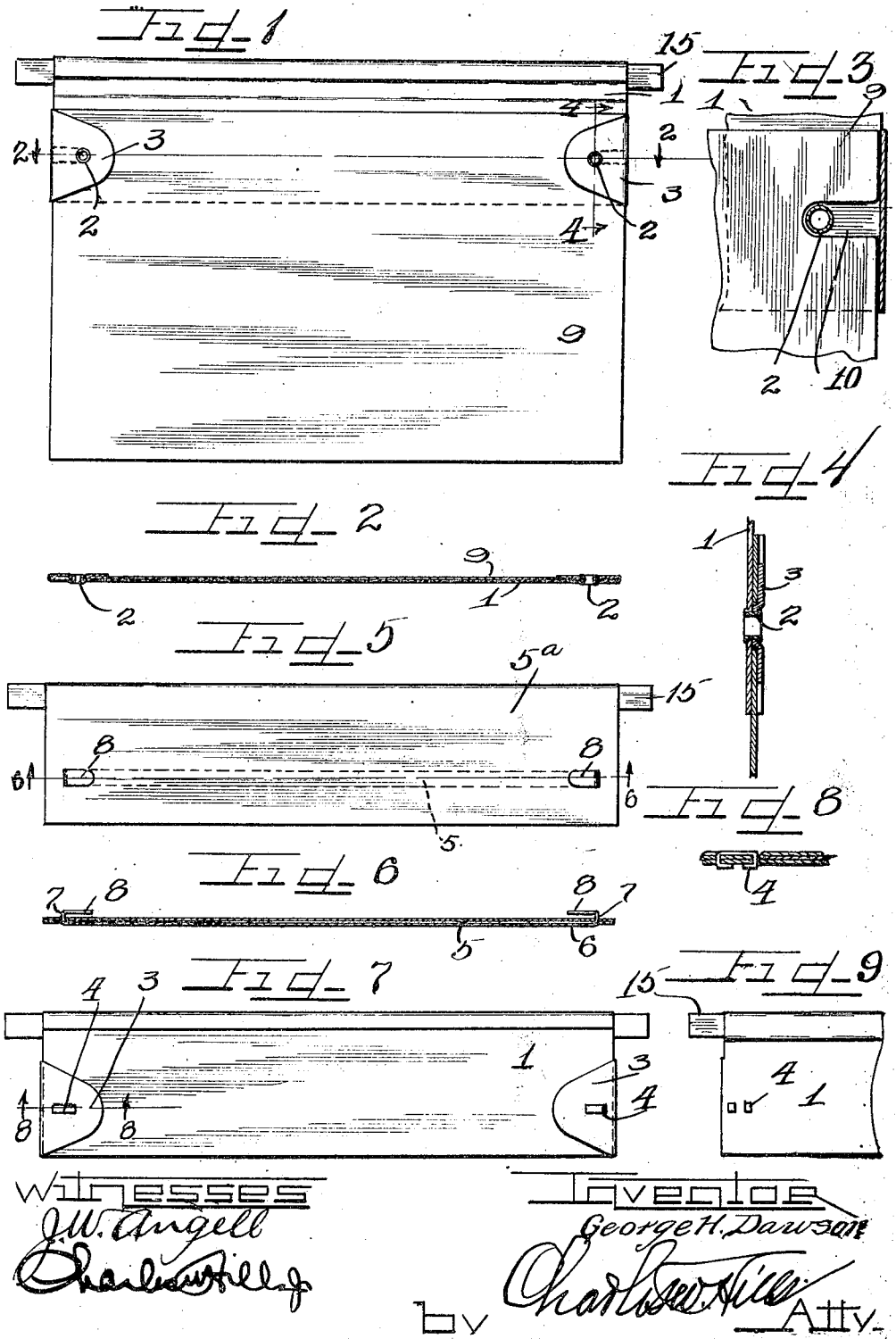

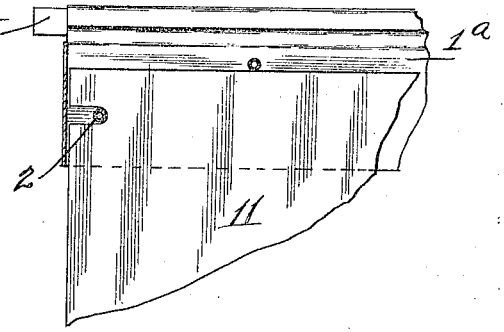

Patented May 27, 1924.

1,495,252

UNITED STATES PATENT OFFICE.

GEORGE H. DAWSON, OF CAMBRIDGE, MASSACHUSETTS, ASSIGNOR TO LIBRARY BUREAU, A CORPORATION OF NEW JERSEY.

SUPPORT FOR INDEX CARDS.

Application filed December 5, 1921. Serial No. 520,187.

*To all whom it may concern:*

Be it known that I, GEORGE H. DAWSON, a citizen of the United States, and a resident of the city of Cambridge, in the county of Middlesex and State of Massachusetts, have invented certain new and useful Improvements in Supports for Index Cards; and I do hereby declare that the following is a full, clear, and exact description of the same, reference being had to the accompanying drawings, and to the numerals of reference marked thereon, which form a part of this specification.

This invention relates to visible index cards which are mounted in overlapping relation in a tray or the like, and this invention concerns itself primarily with the means for and manner of removably mounting the index cards.

This invention comprises the novel features of construction and mechanisms hereinafter described and more particularly pointed out and defined in the appended claims.

In the accompanying drawings which illustrate certain preferred embodiments of my invention and in which similar reference numerals refer to similar features in the different views:

Figure 1 is a front plan view of an index card mounted upon a support according to my invention.

Figure 2 is a section on the line 2—2 of Figure 1.

Figure 3 is a fragmentary view partly in section illustrating certain features upon an enlarged scale.

Figure 4 is a section on the line 4—4 of Figure 1 upon an enlarged scale.

Figure 5 is a plan view of a modified form of my invention.

Figure 6 is a section on the line 6—6 of Figure 5.

Figure 7 is a plan view of a further slightly modified form of my invention.

Figure 8 is an enlarged fragmentary section on the line 8—8 of Figure 7.

Figure 9 is a fragmentary rear view of Figure 7.

Figure 10 is a plan view of a further modified form of my invention illustrating certain features.

Figure 11 is an end elevational view of a ledger sheet which may be used.

Figure 12 is a fragmentary plan view partly in section illustrating certain features of the form shown in Figure 10.

As shown on the drawings:

In referring to Figures 1 to 4, it will be observed that the card support comprises a flexible hinge member 1 preferably of sized fabric having projections 2 extending therefrom which in the present instance are in the form of eyelets to which are secured elements 3 and extending parallel thereto. The elements 3 in Figure 1 comprise flaps which are integral with the hinge member 1 and folded or superimposed thereover from the lateral edges. For simplicity of construction, I may use the staples 4 shown in Figures 7 to 9 instead of the eyelets 2 for providing the card-holding projections and anchoring means for the flaps 3.

In Figures 5 and 6, there is illustrated a slightly modified form of device comprising an elongated metal strip 5 embedded in the fabric hinge 5ª by pasting a suitable strip 6 over the back of the hinge, the embedded portion being substantially equal to the distance between the eyelets 2. And at each end, the strip is provided with a projection 7 extending through the fabric and a horizontal element 8 spaced slightly from the front face of the hinge and extending parallel thereto. In this instance, the projection 7 and elements 8 are formed by bending the ends of the strip in substantially the form of hooks.

The index card 9 that is designed to be used with the aforedescribed card supports is provided with elongated notches or slots 10 at the upper latter edges as shown in Figure 3, the distance between the notches approximating the distance between the projections 2, 4 or 7. The cards are adapted to be mounted upon their supports by flexing the same. A simple way consists of first sliding one end of the card under the element 3 or 8 so that the projections 2, 4 or 7 will enter the slot 10 and then flexing the card slightly so that the other end may be inserted under the other element with its slot receiving the projection thereunder.

In Figures 10 to 12, there is illustrated a folded ledger sheet 11 which may be used in my visible index system by providing notches in the upper lateral edges. When such ledger sheets are used, the retaining elements 12 which are flaps on the hinge member 1ª for holding the sheets on the projections 2 are preferably elongated at their upper edges and secured by eyelets 13 which define the upper limits of the ledger sheet, and from the eyelets 13, the elements 12 taper downwardly at their lower edges so as to facilitate the insertion of the sheet thereunder. It will accordingly be observed that the construction of the elements or flaps 12 is such that the upper ends and corners of the folded ledger sheets will be effectively held together and protected from crimping over or having dog ears formed thereon, and for increasing the flexibility of the hinge member 1ª a slot 14 may be provided in the center just below the supporting bar 15.

The flexible hinge members in all the forms are secured to supporting and spacing bars similar to the bar 15 of Figure 10 which are adapted to be inserted in guide channels in a tray as is well known in the art.

It will accordingly be observed that my invention provides a simple card support that effectively retains a card or ledger sheet thereon and from which the same is removable by a slight flexing movement. It is obvious that by forming the flaps according to the form shown in Figure 10, very thin cards or folded sheets can be readily used.

I am aware that numerous details of construction may be varied through a wide range without departing from the principles of this invention, and I therefore do not purpose limiting the patent granted otherwise than necessitated by the prior art.

I claim as my invention:

1. The combination with a notched card, of a support therefor comprising a flexible hinge member having projections for receiving the notches on said card and holding the same in suspended relation, and means attached to said projections for retaining the card on said support.

2. The combination with a notched card, of a support therefor comprising a fabric strip having projections for engaging the notches in said card for suspending the same on said fabric strip, and elements extending parallel to said strip and spaced slightly therefrom for receiving said card thereunder.

3. The combination with a notched card, of a support therefor comprising a flexible strip having inwardly extending flaps on its lateral edges for receiving the card thereunder, and studs extending through said flaps and strip for engaging the notches in said card and holding the same in suspended relation.

In testimony whereof I have hereunto subscribed my name in the presence of two subscribing witnesses.

GEORGE H. DAWSON.

Witnesses:
 E. B. ALLEY,
 F. M. LINDBERG.